| United States Patent [19] | [11] Patent Number: 4,889,948 |
| Mathias et al. | [45] Date of Patent: Dec. 26, 1989 |

[54] ACRYLATE ESTER ETHER DERIVATIVES

[75] Inventors: Lon J. Mathias, Hattiesburg, Miss.; Selim H. Kusefoglu, Ann Arbor, Mich.

[73] Assignee: University of Southern Mississippi, Hattiesburg, Miss.

[21] Appl. No.: 86,589

[22] Filed: Aug. 18, 1987

[51] Int. Cl.$^4$ .............................................. C07C 69/73
[52] U.S. Cl. .................................... 560/181; 562/583; 558/441; 558/462; 568/415; 564/201
[58] Field of Search .................. 560/181; 562/583; 538/441, 462; 568/415, 201

[56] References Cited

U.S. PATENT DOCUMENTS 3,066,165 11/1962 Rosenthal et al. .................. 562/583
3,288,883 11/1966 Teiman et al. ..................... 562/583
3,743,669 7/1973 Hillman et al. .................. 368/465.6

FOREIGN PATENT DOCUMENTS 0184731 6/1980 European Pat. Off. .

OTHER PUBLICATIONS

Drewes, L. et al., Synth. Commun. 17(3) 291-29 8, 1987.
Amri et al., Hydroxyalkylation de la Methylvinylcetone et De L'Acrylonitrile en Presence de Diaza-1, 4 Bicyclo[2.2.2]Octane, 27 Tetrahedron Letters, pp. 4307-4308 (1986).
Villieras et al, Wittig-Horner Reaction in Heterogeneous Media: 1, An Easy Synthesis of Ethyl α-Hydroxymethylacrylate and Ethyl α-Halomethylacrylates Using Formaldehyde in Water, Synthesis pp. 924-926 (1982).
D. Breslow, "A Polymer That Fights Cancer", Chemtech, pp. 302-307 (1985).

*Primary Examiner*—Paul J. Killos
*Attorney, Agent, or Firm*—Arnold, White & Durkee

[57] ABSTRACT

A process for synthesizing ethers of alkyl alpha(hydroxymethyl)-acrylate by reacting alkyl acrylate and formaldehyde in the presence of a DABCO catalyst. The ethers may be used as cross-linking agents for thermoplastic polymers. Further, these ethers in turn enable synthesis of cyclopolymers that may show promising biological activity.

7 Claims, No Drawings

ACRYLATE ESTER ETHER DERIVATIVES

BACKGROUND OF THE INVENTION

The present invention relates to acrylate ester ethers, processes for their production and isolation, and their use in bulk and solution polymerization. The invention has particular application as cross-linking agents for polymers.

Reaction of methyl acrylates with various aldehydes in the presence of 1,4-diazabicyclo-[2.2.2]-octane (DABCO) has been reported by H. M. R. Hoffmann and J. J. Rabe, 50 J. Org. Chem. 3849 (1985). Lower members of this series have been used previously as synthons in natural product synthesis. Hoffmann and Rabe did not describe, however, products produced when methylacrylate is reacted with formaldehyde. One such product, ethyl alpha(hydroxymethyl) acrylate was synthesized by a Wittig-Horner reaction of triethylphosphonoacetate by J. Villieras and M. Rambaud, Synthesis, p. 924 (1982). Like the Hoffmann and Rabe publication, the Villieras and Rambaud article did not describe the preparation of the products of the present application.

European application number EP 0,184,731 discloses the preparation of 2-1-hydroxy-methyl-acrylonitrile or acrylic acid ester derivative by reacting acrylonitrile or acrylic acid ester with hydrated formaldehyde or formaldehyde semi-acetal using a tertiary amine catalyst such as 1,4-diazabicyclo-[2.2.2]-octane, pyrrocholine or quinolidine. However, this application does not disclose the formation of any ethers.

SUMMARY OF THE INVENTION

When methylacrylate is reacted with formaldehyde under appropriate conditions a series of ether by-products are produced. These by-products are of the formulas:

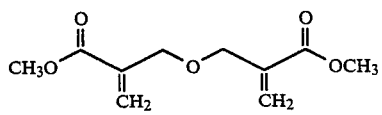
(2)

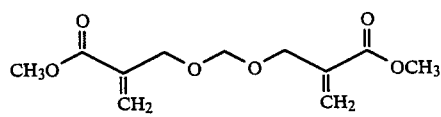
(3)

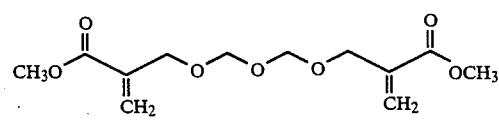
(4)

Other reactive groups may be substituted for the carboxymethyl group in the acrylate ester reactant used to make these ether compounds. Consequently, the present invention as it is embodied and broadly described herein comprises a compound of the following formula:

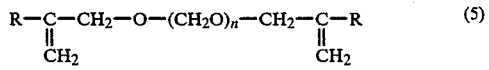
(5)

Where n is an integer from 0 to 4 and R is a member selected from a group consisting of carboxy, carboxyalkyl, carbonylalkyl, cyano, carboxamide, and substituted carboxamide.

A second aspect of the present invention is the inclusion of the above-described monomers in polymer compositions as cross-linking agents for those compositions.

A third aspect of the present invention is the cyclopolymerization of the ether compounds of the type shown in formula 2 to form cyclopolymers having the following repeating units:

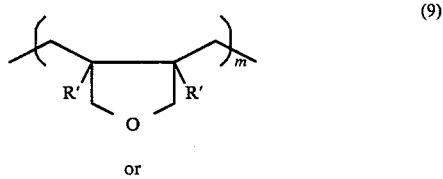
(9)

or

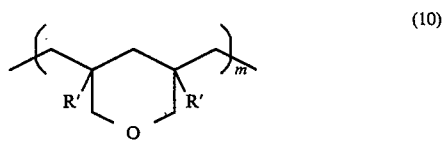
(10)

where R' is a member selected from the group consisting of carboxy, carboxyalkyl, carbonylalkyl, cyano, carboxamide, and substituted carboxamide. Generally m is greater than 5.

One advantage of the present invention is that it provides a class of monomers that may act as cross-linking agents in polymer compositions.

Another advantage is that the inclusion of the above-described monomers in polymer products produces clear, tough, hydrolytically stable cross-linked products.

Additional advantages of the invention will be set forth in part in the description which follows, and in part will be obvious from the description, or may be learned by practice of the invention.

DETAILED DESCRIPTION OF PREFERRED EMBODIMENTS

The present invention relates to products produced in the reaction of acrylate esters and other ethylenically unsaturated monomers with paraformaldehyde, formalin or gaseous formaldehyde in the presence of catalytic amounts of DABCO. The primary product of the reaction in which methyl acrylate is the ethylenically unsaturated monomer is a methyl alpha-hydroxymethyl acrylate of the formula:

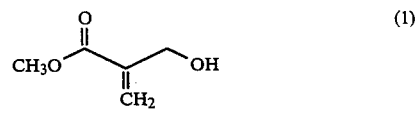
(1)

This reaction also produces a number of by-products, primarily homologous ethers having the following formulas:

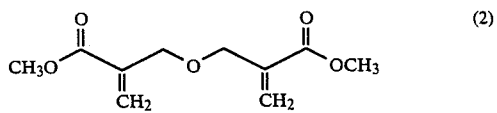
(2)

-continued

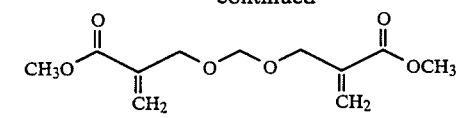

(3)

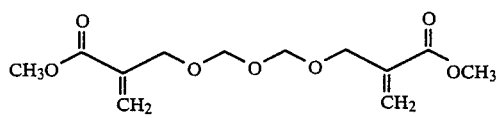

(4)

These by-product ethers can be separated from the distillation residue by column chromatography.

The alpha-hydroxymethyl acrylate product 1 may be removed from the reaction mixture by water extraction, followed by fractional crystallization or column chromatography of the water insoluble fraction. These compounds can be employed in both addition and condensation polymerizations.

The ether compounds 2, 3 and 4 are bis-unsaturated ethers which can function as cross-linking agents, while compound 2 has the additional ability of cyclopolymerization to tetrahydropyran or tetrahydrofuran containing polymers.

In general, the methods of making and isolating the products of the present invention are as follows:

When paraformaldehyde is the formaldehyde source, an alkylacrylate, preferably methyl or ethyl acrylate, and paraformaldehyde, preferably having a molecular weight between 5 and 20, are mixed in a molar ratio of preferably about 3:2 to about 8:2 alkylacrylate to paraformaldehyde. The components are then stirred at room temperature for a period of about 5 to about 10 days in the presence of about 5 to 10% by weight DABCO (based on the weight of paraformaldehyde in the mixture).

After the paraformaldehyde is completely consumed, the excess alkylacrylate is removed by evaporation under a reduced pressure of about 10–20 mm Hg. and may be recycled if desired. The resulting product mixture will generally consist of about 45–60% by weight alkyl alpha-(hydroxymethyl) acrylate, about 30–45% of ether compounds 2, 3 and 4 and about 2–8% of a polymeric material consisting of higher ethers and/or vinyl polymers.

The products made in this process may be isolated using either of two procedures. In the first procedure, the mixture is extracted with water, in which the alkyl alpha-(hydroxymethyl) acrylate is soluble. Re-extraction of the aqueous phase with about an equal volume of ether and evaporation of the ether generally yields a product in about 85% purity. This material may then be distilled in a fractional vacuum to yield about 98% purity. The overall yield based on the limiting reagent is generally about 30–40%.

The water insoluble phase may be dissolved in a minimum amount of methanol, acidified with an amount of about 1% by volume of 10% by weight aqueous solution of $H_2SO_4$ and stirred at room temperature for about three hours. The ether compounds 3 and 4 may be hydrolyzed to provide more alkyl alpha-(hydroxymethyl) acrylate. Although compounds 3 and 4 are hydrolyzed, ether compound 2 remains unchanged.

Evaporation of compound 1 followed by a water extraction and ether re-extraction provides more compound 1 and may bring the total yield of alkyl alpha-(hydroxymethyl) acrylate up to 60–70%. Re-crystallization of the water insoluble residue from methanol produces compound 2 in about 10–20% yield.

The second procedure that may be used to increase the total yield of the alpha-(hydroxymethyl) acrylate is to vacuum distill the reaction mixture, which converts ether compounds 3 and 4 to compound 1. The yield of compound 1 is generally 60–70% in about 93–95% purity. The distillation conditions lead to hydrolysis of compounds 3 and 4 to compound 1 and formaldehyde. The distillation residue can be fractionally recrystallized from methanol to give a yield of compound 2 of about 10–20%.

The ethers of the present invention can also be formed directly from the alkyl alpha-(hydroxymethyl) acrylates by heating the acrylates in the presence of DABCO for a sufficient length of time to permit the reaction to occur. For example, bis[2-ethoxycarbonyl-2-propenyl]ether, compound 2, can be formed by heating purified ethyl alpha-(hydroxymethyl) acrylate and DABCO at about 74° C. for about 23 hours. Over a 50% yield of the ether can be obtained.

When formalin is the formaldehyde source, an alkyl acrylate and commercial formalin may be mixed in a molar ratio of about 1:1 to about 5:1 alkyl acrylate to formalin, preferably a 1.1:1 molar ratio is used. This mixing provides a two-phase mixture. An alkyl alcohol (equal volume to formalin) is also added. This mixture is stirred for about 2 to about 10 days, preferably 4 days, with incremental addition of 2% DABCO per day until about 5–8% DABCO by weight (based upon the amount of formalin) has been added. The acrylate and alcohol are then removed by evaporation and the remaining aqueous solution is extracted with ether to give essentially pure compound 1 in about 20–25% conversion. Longer reaction times will not generally improve this conversion.

When gaseous formaldehyde is the formaldehyde source, gaseous formaldehyde, such as is produced by pyrolysis of paraformaldehyde or by de-polymerization of trioxane, is fed into a stirring mixture of alkyl acrylate and DABCO over the course of 3 days. There is generally considerable re-polymerization of formaldehyde both in the liquid acrylate and on the walls of the flask. However, the reaction proceeds as expected to give a product mixture which is essentially the same as that obtained when paraformaldehyde is used as the formaldehyde source. Purification of this product in the same manner as described above for the alkyl acrylate/paraformaldehyde mixture produces about 30–35% conversion and about 60% yield of compound 1.

The polymers of the present invention can be prepared using any conventional polymerization technique. These polymers include as monomers 20 to 99% by weight of at least one ethylenically unsaturated monomer and from 1 to 80% by weight of the methyl α-hydroxymethyl acrylate ether monomers of the present invention.

The ethylenically unsaturated monomers useful to form the polymer of the present invention preferably includes monoalkenyl aromatic monomers, acrylic monomers and other vinylic monomers. The monoalkenyl aromatic monomers include, for example, α-methyl styrene, styrene, vinyl toluene, tertiary butyl styrene, ortho-chlorostyrene and mixtures thereof.

The term "acrylic monomer" as employed herein includes acrylic or methacrylic acid, esters of acrylic or methacrylic acid and derivatives and mixtures thereof. Examples of suitable acrylic monomers include the following methacrylate esters: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimenthylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tertbutyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate.

Other suitable acrylic monomers include methacrylic acid derivatives such as: methacrylic acid and its salts, methacrylonitrile, methacrylamide, N-methylmethacrylamide, N-ethylmethacrylamide, N,N-diethylmethacrylamide, N,N-dimethylmethacrylamide, N-phenylmethacrylamide and methacrolein.

Typical acrylate esters employed include: methyl acrylate, ethyl acrylate, n-propyl acrylate, isopropyl acrylate, n-butyl acrylate and n-decyl acrylate.

Acrylic acid derivatives employed as the acrylic monomer include: acrylic acid and its salts, acrylonitrile, acrylamide, methyl α-chloroacrylate, methyl 2-cyanoacrylate, N-ethylacrylamide, N,N-diethylacrylamide and acrolein.

The acrylic monomer can also include acrylates or methacrylates containing cross-linkable functional groups, such as hydroxy, carboxyl, amino, isocyanate, glycidyl, epoxy, allyl, and the like. The functional polymers are usually prepared by polymerization employing a functional monomer or by post-reaction of a polymer of the invention to introduce the desired functionality.

Esters of methacrylic acid or acrylic acid containing a suitable condensable cross linkable functional group may be used as a monomer. Among such esters are t-butylaminoethyl methacrylate, isopropylidene glyceryl methacrylate and oxazolidinylethyl methacrylate.

The following examples are representative of the methods of producing the products of the invention. In the following Examples all parts and percentages are by weight unless otherwise noted and all temperatures are in degrees Celsius.

EXAMPLE I

Methylacrylate (1450g), paraformaldehyde (180g) and DABCO (20g) were mixed and stirred at room temperature for 10 days. At the end of this period excess paraformaldehyde was removed by filtration and excess methyl acrylate was removed on a rotary evaporator at 20 mm pressure and 65° C. temperature. The remaining mixture contained 49% of compound 1, 22% of compound 2, 18% of compound 3 and 6% of compound 4. Fractional distillation of this mixture at 0.05 mm pressure and 60°–65° C. head temperature gave 275g of compound 1 (66%, based on paraformaldehyde consumed). Continued distillation at 0.05 mm pressure and 85°–105° C. and recrystallization of the distillate from methanol gave 22g of compound 2 (3% based on paraformaldehyde consumed).

EXAMPLE II n-Butyl acrylate (32g), paraformaldehyde (6g) and DABCO (1.5g) were mixed and stirred at room temperature for 10 days. At the end of this period the mixture was dissolved in 200 ml of ether, filtered to remove a small amount of insoluble material, washed twice with 5% aq. HCl and the ether evaporated to give 34g of product mixture. Part of this mixture was separated by preparative gas chromatography to give 23% untreated n-butyl acrylate, 20% alpha-(hydroxymethy)-n-butyl acrylate, the n-butyl homologue of compound 1; 19% of the n-butyl homologue of compound 2, 21% of the n-butyl homologue of compound 3 and 5% of the n-butyl homologue of compound 4. Product 1 can be separated from the mixture by fractional distillation at 0.08 mm and 82° C. head temperature.

EXAMPLE III

Formalin (8g), methyl acrylate (103g) and DABCO (5g) were mixed and stirred for a total of 20 days at room temperature. Five more grams of DABCO were added in increments during this period. At the end of 20 days the reaction was stopped. Two phases separated. The aqueous phase was extracted with ether after acidification with HCl to give 13.5g of compound 1. The organic phase was evaporated under vacuum to give 8.0g of compound 1 with a combined yield of 21.5g. Recovered methyl acrylate was 76g giving a 26% conversion and 58% yield.

The crude reaction mixtures from Examples I–III can be heated at about 60°–100° C. to convert the hydroxymethyl compounds to the ether compounds before separation to increase the yield of the ethers. The reaction can be carried out for a period of several hours to several days with longer periods increasing the amount of ether formed.

EXAMPLE IV

Methyl acrylate (1600g), paraformaldehyde (200g) and DABCO (40g) were stirred at 65° C. for 2-½ days. Workup as in Example I gave 33% product 1. There was considerable discoloration and polymerization at this higher reaction temperature.

EXAMPLE V

Ethyl alpha-(hydroxymethyl) acrylate (982mg, 96.3% pure) containing 0.4% of the corresponding ether, and 1,4-diazabicyclo-[2.2.2]-octane (124mg, 11.2% by weight) were heated at 74° C. for 23 hours. Gas chromatography showed that the mixture contained 20% starting material, 54% ether (bis[2-ethoxycarbonyl-2-propenyl]ether), and two unidentified compounds present in amounts of 6% and 3%. Overall conversion of the acrylate to the ether was greater than 65%

The difunctional ether compounds 2, 3 and 4 are useful as cross-linking agents and are capable of cyclopolymerization. Compound 2, for example, readily undergoes polymerization in dimethylsulfoxide initiated with 2,2'-azobisisobutyronitrile to give a clear, tough polymer that is insoluble and highly cross-linked. This material is surprising tenacious in retaining solvent which cannot be removed even with extended solvent exchange with water.

Photopolymerization of a thin film of compound 2 in the presence of catalytic amounts of benzoin isopropyl ether gives a clear film with good physical properties. The IR spectrum of this film shows disappearance of the monomer with formation of the polymer.

These difunctional acrylate ethers have the potential to replace existing diacrylate esters in a variety of applications such as photocurable coatings and photolithography. In addition, they yield products that are more hydrolytically stable since hydrolysis of the ester groups will not lead to a decrease in the polymer cross-link density.

Radical and photoinitiated bulk polymerization, and radical solution polymerization of compound 2 in dimethylsulfoxide gives only highly cross-linked insoluble products. Another procedure, however, leads to the synthesis of polymers having the following repeating unit:

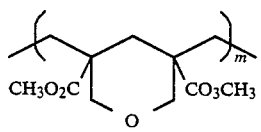
(6)

Partial hydrolysis of this structure leads to its water soluble derivative:

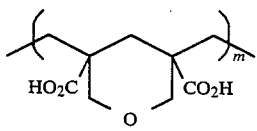
(7)

The following example describes a process for making the soluble polymer structure 6.

EXAMPLE VI

A 3% benzene solution of compound 2 was polymerized with 2,2'-azobisisobutyronitrile at 60° C. The polymer that precipitated was soluble in chloroform and methylene chloride. Reprecipitation into ether produced cyclopolymer 6 as a white powder having a melt/decomposition temperature of 270°–275° C. DSC confirmed the melting transition at 270° C. and also showed a strong glass transition at 170° C. The intrinsic viscosity of this polymer was found to be 0.43 dL/g in CHCl$_3$ at 25° C. Chloroform and acetone are also good solvents for this process.

Homologues of ether compound 2 can also be polymerized to form cyclopolymers corresponding to cyclopolymer 6.

The following example describes a process for hydrolyzing cyclopolymer 6 to produce cyclopolymer 7.

EXAMPLE VII

Cyclopolymer 6 was hydrolyzed overnight under heterogeneous conditions in a 1:1 mixture of methanol and water containing 5% NaOH at 65°–70° C. A viscous polymer solution resulted, which was acidified to precipitate the polycarboxylic acid cyclopolymer 6 which was soluble in aqueous base.

The IR spectrum of this material showed strong, broad peaks at 3350 and 1170 cm$^{-1}$ attributed to the free acid groups. $^{13}$C NMR in dilute base showed a greatly reduced peak for the ester methyl carbon, and two peaks for the carbonyl groups corresponding to hydrolyzed and unhydrolyzed ester units. The ratio of these latter two peaks was approximately 3:1, indicating about 75% hydrolysis.

EXAMPLE VIII

A mixture of the ether compound 2 (500mg, 2.34 mmol) and azobisisobutyronitrile (AIBN, 15mg, 4 mole% of monomer) was dissolved in 13 ml benzene. The solution was flushed with nitrogen for 5 minutes and sealed. The solution was then heated in a hot water bath at 60°–70° for several hours, during which precipitate formed. The solution was cooled, and solvent removed by rotary evaporation. The white product thus obtained was extracted first with ether to remove any unreacted monomer. The residual powder was then mostly dissolved in chloroform, although a small amount remained insoluble and was removed by filtration. The chloroform solution was slowly added to rapidly stirring methanol to give a white powdery precipitate which was removed by filtration and dried under vacuum.

The total yield of soluble and insoluble polymer increases with the initiator concentration and the length of polymerization, while the ratio of soluble to insoluble material increases with increasing initiator concentration.

Polymer characterization involved infrared and nuclear magnetic spectroscopy, dilute solution viscosity and thermal analysis. Spectroscopy confirmed the absence of residual vinyl groups in the soluble polymer and is consistent with a cyclopolymerized structure. Intrinsic viscosity values were obtained for polymer synthesized in a number of different solvents including chloroform and acetone, and all values were in the range of 0.1–0.5 dL/g. Thermal analysis indicated a glass transition of approximately 145°–170° C. and a decomposition temperature of approximately 300° C.

Hydrolysis of the obtained cyclopolymer was accomplished in a heated mixture of sodium hydroxide, water and methanol. Gradual dissolution of the initially insoluble polymer gave a viscous solution. Acidification with dilute acid led to precipitation of the partially or completely hydrolyzed polymer. The degree of hydrolysis increased with reaction time. The hydrolyzed polymer can be redissolved in dilute aqueous base and analyzed by nuclear magnetic resonance spectroscopy to determine the extent of hydrolysis Pyran copolymers, obtained from the 2:1 copolymerization of divinyl ether and maleic anhydride, have been found to exhibit high activity as anti-tumor and anti-metastatic agents. See Butler, G. B., 22 J. Marcrolmol. Sci., Rev. Mac. Romol. Chem. Phys., p. 89 (1982); Shultz, R. M., Altom, M. G., 5 J. Immunocharmacol, p. 277 (1983); Zaharko, S. D., Covey, G. M., 68 Cancer Treat. Rep., p. 1255 (1984). Because of the structural similarity between cyclopolymers 6 and 7, it would be expected that these products would have similar biological utility as has been shown in the products described in the above-cited references.

The utility of compound 2 as a cross-linking agent is shown in the following example.

EXAMPLE IX

A mixture of methyl methacrylate with 3.5% of ether 2 and 1% azobisisobutyronitrile was heated at 70° C. for two hours, producing an insoluble sample of poly(- methyl methacrylate) that contained no residual unsaturation.

Photopolymerization of ether 2 and methyl methacrylate in the presence of benzoin isopropyl ether in bulk or in thin films also gave insoluble poly(methyl methacrylate).

The IR and $^{13}C$ NMR spectra of the insoluble polymers produced in Example IX were essentially identical to those of soluble poly(methyl methacrylate) prepared under the same reaction conditions. When cross-linked and uncross-linked samples were subjected to identical hydrolysis conditions, the former did not swell while the latter swelled and dissolved.

Example IX therefore shows that ether compound 2 produces hydrolytically stable cross-links that possess real advantages over other available bis-acrylate esters now used for cross-linking.

The following example shows a process for synthesizing a rubbery polymer with an amount of the diacid analog of ether compound 2 shown in the following formula:

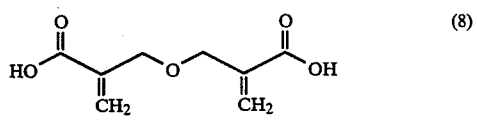

(8)

EXAMPLE X

Ether compound 2 was hydrolyzed in aqueous methanol under basic catalysis. This hydrolysis produced the salt of the bisacrylic acid ether compound 8. Upon acidification, ether compound 8 precipitated in quantitative yield as a white powder melting with concurrent polymerization at 118°–120° C.

An aqueous solution of acrylic acid containing 3.2 mol% of ether compound 8 was heated with V-50 azo initiator (a water-soluble azo initiator produced by Wako Chemical U.S.A., Inc., Warrington, PA) producing a rubbery polymer. This polymer, unlike poly(acrylic acid), could not be dissolved by addition of more water or aqueous base.

Examples IX and X show that both the di-ester compound 2 and the di-acid compound 8 are highly reactive cross-linking agents for vinyl polymers. They are superior to commercially available bis-acrylate esters because the cross-links formed in ether compounds 2 and 8 consist of carbon and ether linkages. Unlike the ester linkages contained in currently available analogs, these ether linkages are not readily susceptible to hydrolysis.

The following example shows the use of the ether compounds of the present invention to form additional polymers.

EXAMPLE XI

Bis($\beta,\beta'$-mercaptoethyl)ether (325mg, 2.4mmol) and bis (2-ethoxycarbonyl-2-propenyl) ether (580mg, 2.4 mmol) were mixed together. Triethylamine (16mg, 1.7 wt-%) was added and an exothermic reaction occurred along with a rapid increase in the viscosity of the mixture. After 30 minutes of reaction, chloroform was added to dissolve the mixture. Further increase in solution viscosity occurred over a several day period. Polymer was isolated by pouring the viscous solution into ether. The solvent was then decanted and the residual material dried under vacuum. The polymer was a very viscous oil.

A variety of bisthiols were reacted with the ether compound 2 to give polymers. These included alkyl and aryl compounds. Polymerizations usually took place at ambient temperature, although heating the reaction mixture increased the rate of polymer formation. Spectroscopic characterization of the polymers confirmed polymer structures resulting from addition of the thiol units to the unsaturated groups in the ether, thus leading to new thioether units in the polymer.

In addition to the bisthiols, amines can be reacted with the ether compounds of the present invention to give polyamines.

Additional advantages and modifications will readily occur to those skilled in the art. The invention in its broader aspects is therefore not limited to the specific examples shown and described. Accordingly, departures may be made from the detail shown in the examples without departing from the spirit or scope of the disclosed general inventive concept.

What is claimed is:

1. A vinyl monomer of the formula:

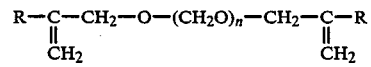

wherein n is an integer from 0 to 4 and R is a member selected from the group consisting of carboxy, carboxyalkyl, carbonylalkyl, cyano, carboxamide, and substituted carboxamide.

2. The vinyl monomer of claim 1 wherein n is 0.
3. The vinyl monomer of claim 1 wherein n is 1.
4. The vinyl monomer of claim 1 wherein n is 2.
5. The vinyl monomer of claim 1 wherein R is a member selected from the group consisting of carboxy and carboxymethyl.
6. A method of preparing the vinyl monomer of claim 1 comprising reacting an acrylate ester with formaldehyde in the presence of 1,4-diazabicyclo [2.2.2]-octane and separating the monomer from the resulting reaction mixture.
7. A method of preparing the vinyl monomer of claim 1 comprising heating alkyl alpha-(hydroxymethyl) acrylate in the presence of 1,4-diazabicyclo [2.2.2.]-octane and separating the monomer from the resulting reaction mixture.

* * * * *